(12) United States Patent
Mochizuki et al.

(10) Patent No.: US 9,611,000 B2
(45) Date of Patent: Apr. 4, 2017

(54) FRONT FORK

(71) Applicant: KAYABA INDUSTRY CO., LTD., Tokyo (JP)

(72) Inventors: Takahisa Mochizuki, Gifu (JP); Naoki Ito, Gifu (JP); Keiji Saito, Tokyo (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/779,038

(22) PCT Filed: Mar. 4, 2014

(86) PCT No.: PCT/JP2014/055363
§ 371 (c)(1),
(2) Date: Sep. 22, 2015

(87) PCT Pub. No.: WO2014/156499
PCT Pub. Date: Oct. 2, 2014

(65) Prior Publication Data
US 2016/0052589 A1 Feb. 25, 2016

(30) Foreign Application Priority Data

Mar. 27, 2013 (JP) .................................. 2013-065545

(51) Int. Cl.
| | |
|---|---|
| *B62K 25/08* | (2006.01) |
| *B62K 25/06* | (2006.01) |
| *F16F 9/28* | (2006.01) |
| *F16F 9/53* | (2006.01) |

(52) U.S. Cl.
CPC ............. *B62K 25/08* (2013.01); *B62K 25/06* (2013.01); *F16F 9/28* (2013.01); *F16F 9/535* (2013.01); *F16F 9/532* (2013.01)

(58) Field of Classification Search
CPC ......... B62K 25/08; B62K 25/06; F16F 9/532; F16F 9/28; F16F 9/535
See application file for complete search history.

(56) References Cited

U.S. PATENT DOCUMENTS

| | | | | |
|---|---|---|---|---|
| 4,561,669 | A | * 12/1985 | Simons | ............... B60G 15/061 180/219 |
| 6,471,018 | B1 | 10/2002 | Gordaninejad et al. | |
| 7,063,343 | B1 | 6/2006 | Chen | |
| 7,822,519 | B2 | 10/2010 | Masamura | |
| 8,496,094 | B2 * | 7/2013 | Powell | ................... B62K 25/08 188/285 |
| 2003/0001358 | A1 * | 1/2003 | Becker | .................. B62K 25/08 280/276 |

(Continued)

FOREIGN PATENT DOCUMENTS

| | | |
|---|---|---|
| JP | 2008-012959 A | 1/2008 |
| TW | M274311 U | 9/2005 |
| TW | M378853 U | 4/2010 |

*Primary Examiner* — Kevin Hurley
*Assistant Examiner* — Marlon A Arce
(74) *Attorney, Agent, or Firm* — Rabin & Berdo, P.C.

(57) ABSTRACT

A front fork includes a pair of dampers standing on both sides of a wheel. One of the pair of dampers is a magnetic viscous fluid damper configured to use a magnetic viscous fluid whose viscosity is changed by an action of a magnetic field as a working fluid, while the other of the pair of dampers is a liquid-pressure damper configured to use a liquid such as oil, water, an aqueous solution and the like as the working fluid.

5 Claims, 7 Drawing Sheets

(56) References Cited

U.S. PATENT DOCUMENTS

| | | | |
|---|---|---|---|
| 2009/0001684 A1* | 1/2009 | McAndrews | B62K 25/08 280/276 |
| 2013/0320647 A1* | 12/2013 | Awasa | B62K 21/02 280/276 |
| 2014/0062056 A1* | 3/2014 | Battlogg | B62K 25/08 280/276 |
| 2015/0041263 A1* | 2/2015 | Saito | F16F 9/535 188/267.2 |
| 2015/0197307 A1* | 7/2015 | Mochizuki | F16F 13/007 267/221 |

* cited by examiner

FRONT FORK

TECHNICAL FIELD

The present invention relates to improvement of a front fork.

BACKGROUND ART

A front fork is used for suspending a front wheel of a saddle-type vehicle such as a bicycle, tricycle and the like and includes a pair of dampers supporting the front wheel and a suspension spring elastically supporting a vehicle body by urging the dampers in an extending direction. In the front fork, as illustrated in FIG. 6, a damping characteristic (a change in a damping force with respect to a piston speed) is preferably constituted such that an extension-side damping force obtained by synthesis of the both dampers is relatively higher than a compression-side damping force. By employing such characteristic, a pushing-up input can be relaxed by a low compression-side damping force, and a high extension-side damping force can be exerted in the subsequent extension stroke, and vibration of a sprung member and an unsprung member can be quickly converged.

Dampers used for automobiles include a magnetic viscous fluid damper using a magnetic viscous fluid as a working fluid. For example, as illustrated in FIG. 7, a magnetic viscous fluid damper DC disclosed in JP2008-12959A is set as a single cylinder type and includes a cylindrical cylinder 100, a piston rod 200 going into/out of the cylinder 100, piston 300 held at a distal end of the piston rod 200 and defining a rod-side chamber r1 and a piston-side chamber r2 formed in the cylinder 100, a piston passage L1 formed in the piston 300 and allowing the rod-side chamber r1 and the piston-side chamber r2 to communicate with each other, a gas chamber r3 formed in the cylinder 100 and compensating for a change of an in-cylinder capacity for a piston rod mass going into/out of the cylinder 100, and a free piston 400 in sliding contact with an inner peripheral surface of the cylinder 100 and defining the piston-side chamber r2 and the gas chamber r3, and the magnetic viscous fluid as the working fluid is filled in the rod-side chamber r1 and the piston-side chamber r2, while a compressed gas is sealed in the gas chamber r3.

The magnetic viscous fluid damper DC includes viscosity adjusting means V6 for adjusting viscosity of the magnetic viscous fluid passing through the piston passage L1. The viscosity adjusting means V6 is composed of a coil provided on the piston 300 and conducting means for conducting electricity to the coil. When an electric current is made to flow through the coil by the conducting means, a magnetic field is generated in the piston passage L1, and the viscosity of the magnetic viscous fluid flowing through the piston passage L1 can be adjusted. The damping force generated when the magnetic viscous fluid damper DC is extended/contracted is caused by resistance when the magnetic viscous fluid in the chamber pressurized by the piston 300 moves to the other chamber through the piston passage L1. Since the resistance is changed in accordance with the viscosity of the magnetic viscous fluid, the damping force of the magnetic viscous fluid damper DC can be adjusted by the viscosity adjusting means V6.

SUMMARY OF INVENTION

In the prior-art magnetic viscous fluid damper DC, if an electric current amount flowing through the coil is constant, the extension-side damping force and the compression-side damping force become substantially equal, but if a supplied electric current amount to the coil is adjusted as appropriate in conformity to a skyhook control rule, a desired damping characteristic can be obtained. However, if the prior-art magnetic viscous fluid damper DC is used for a front fork, it is preferable that a desired damping characteristic as illustrated in FIG. 6 is obtained, for example, without depending on the control rule.

The present invention has an object to provide a front fork capable of realizing a desired damping characteristic without depending on the control rule even if the magnetic viscous fluid damper is used.

According to one aspect of the present invention, a front fork provided with a pair of dampers standing on both sides of a wheel is provided. One of the pair of dampers is a magnetic viscous fluid damper configured to use a magnetic viscous fluid whose viscosity is changed by an action of a magnetic field as a working fluid, while the other of the pair of dampers is a liquid-pressure damper configured to use a liquid such as oil, water, an aqueous solution and the like as the working fluid.

DESCRIPTION OF EMBODIMENTS

Figure 1:
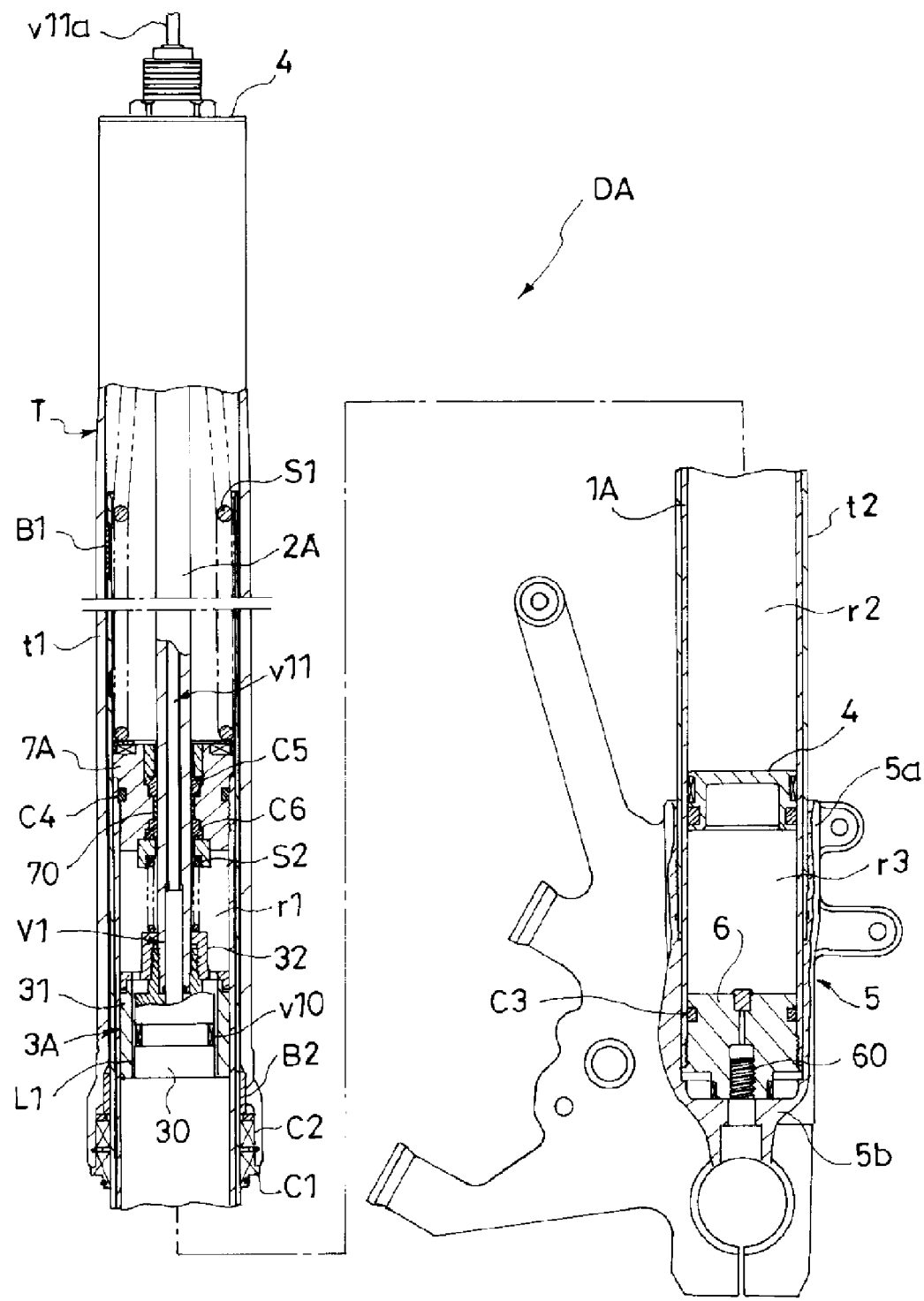
FIG. 1 is a front view illustrating a magnetic viscous fluid damper which is one of a pair of dampers constituting a front fork according to an embodiment of the present invention in a partially broken manner.

By referring to the attached drawings, a front fork according to an embodiment of the present invention will be explained. The same reference numerals given throughout some drawings indicate the same or corresponding components.

Figure 2:
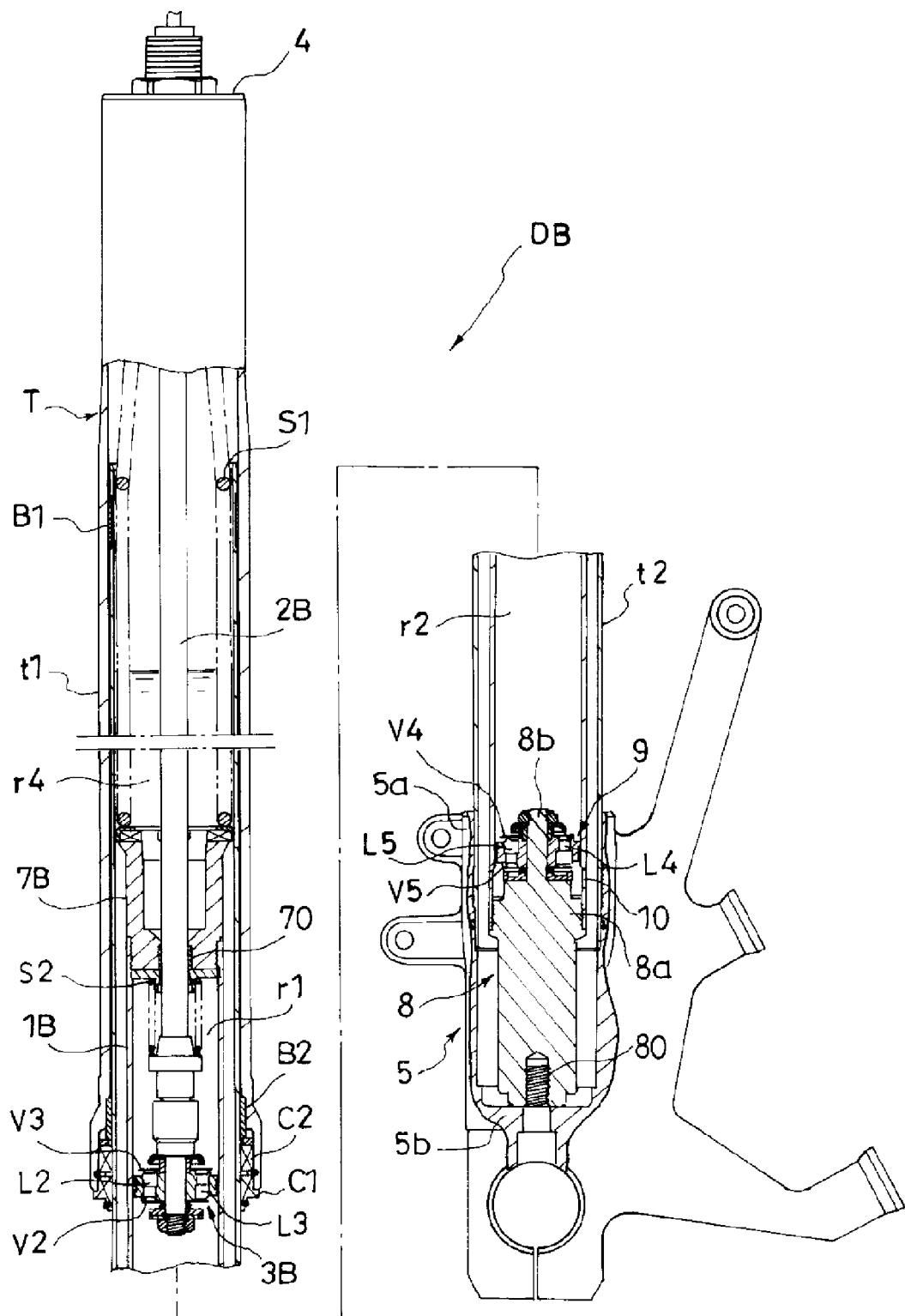
FIG. 2 is a front view illustrating a liquid-pressure damper which is the other of the pair of dampers constituting the front fork according to the embodiment of the present invention in a partially broken manner.

As illustrated in FIGS. 1 and 2, the front fork includes a pair of dampers DA and DB standing on both sides of a vehicle, and one of the pair of dampers DA and DB is the magnetic viscous fluid damper DA using a magnetic viscous fluid whose viscosity is changed by an action of a magnetic field as a working fluid, while the other of the pair of dampers DA and DB is a liquid-pressure damper DB using a liquid such as oil, water, an aqueous solution and the like as the working fluid.

Since a configuration of the front fork is known, it is not illustrated in detail. The front fork includes the pair of dampers DA and DB, a vehicle-body side bracket, not shown, connected to a vehicle body frame which connects these dampers DA and DB and becomes a frame of the vehicle body, and a wheel-side bracket 5 which connects each of the dampers DA and DB to an axle of a front wheel. Each of the dampers DA and DB includes a damper body T of a telescopic type which constitutes an outer shell. The damper body T is composed of an outer tube t1 and an inner tube t2 going into/out of the outer tube t1. The vehicle-body side bracket is connected to the outer tube t1, while the wheel-side bracket 5 is connected to the inner tube t2. Each of the dampers DA and DB has a configuration in which, if a pushing-up input is made from a road surface, the inner tube t2 enters into the outer tube t1 and extends/contracts. The front fork in this embodiment is an inverted type in which the outer tube t1 is connected to the vehicle-body side, while the inner tube t2 is connected to the wheel side. Instead of this, an upright type in which the outer tube t1 is connected to the wheel side and the inner tube t2 is connected to the vehicle body side may be employed.

In the pair of dampers DA and DB, one damper is the magnetic viscous fluid damper DA, while the other damper is the liquid-pressure damper DB. In the damper bodies T of the both dampers DA and DB, suspension springs S1 for elastically supporting the vehicle body by urging each of the dampers DA and DB in an extension direction are accommodated, respectively. The suspension spring S1 can absorb a pushing-up input inputted into the front wheel. In this embodiment, a coil spring is used for the suspension spring S1. Instead of this, an air spring may be used.

Upper openings of the damper bodies T of the both dampers DA and DB are closed by cap members 4, and lower openings are closed by the wheel-side brackets 5. A lower opening of a cylindrical gap formed between an overlapping portion of the outer tube t1 and the inner tube t2 is closed by seal members C1 and C2 made of a dust seal and an oil seal. Thus, a liquid or a gas accommodated in each of the damper bodies T does not leak to an outside air side.

The magnetic viscous fluid damper DA includes, as illustrated in FIG. 1, the damper body T, a cylindrical cylinder 1A arranged concentrically with the damper body T, a piston rod 2A going into/out of the cylinder 1A with expansion/contraction of the damper body T, a piston 3A held at a distal end of the piston rod 2A and defining a rod-side chamber r1 and a piston-side chamber r2 formed in the cylinder 1A, a magnetic viscous fluid as a working fluid filled in the rod-side chamber r1 and the piston-side chamber r2, and a free piston 4 defining a gas chamber r3 compensating for an in-cylinder capacity on an anti-piston rod side of the cylinder 1A. In the gas chamber r3, a compressed gas is sealed and pressurizes the magnetic viscous fluid all the time.

The cylinder 1A is fixed to the wheel-side bracket 5 so that its shaft center becomes coaxial with the shaft center of the inner tube t2. Specifically, the wheel-side bracket 5 is formed having a cylindrical shape with a bottom, and with an inner periphery of an upper opening portion 5a of the wheel-side bracket 5, a lower end portion of the inner tube t2 is screwed. To a bottom portion 5b of the wheel-side bracket 5, a sealing member 6 is fixed by a bolt 60, and the cylinder 1A is screwed with an outer periphery of this sealing member 6.

An annular O-ring C3 is provided between the cylinder 1A and the sealing member 6, and a space between the cylinder 1A and the sealing member 6 is closed by the annular O-ring C3. To an upper opening portion of the cylinder 1A, an annular rod guide 7A is fixed, and the piston rod 2A penetrates a shaft center portion of the rod guide 7A. An annular O-ring C4 is provided between the cylinder 1A and the rod guide 7A, and a space between the cylinder 1A and the rod guide 7A is closed by the O-ring C4. On an inner periphery of the rod guide 7A, annular seal members C5 and C6 in sliding contact with an outer peripheral surface of the piston rod 2A are held, and a space between the piston rod 2A and the rod guide 7A is closed by the seal members C5 and C6. Since upper and lower openings of the cylinder 1A are closed by each of the seal members, the magnetic viscous fluid accommodated in the cylinder 1A does not leak to the outside.

A pair of bushes B1 and B2 pivotally supporting the inner tube t2 capable of going into/out of the outer tube t1 are arranged on the overlapping portion of the outer tube t1 and the inner tube t2. Between the cylinder 1A and the damper body T, a lubricant liquid for lubricating sliding surfaces of the pair of bushes B1 and B2 is accommodated. The magnetic viscous fluid and the lubricant liquid are not mixed with each other due to presence of the seal members C4, C5, and C6. For the lubricant liquid, a working oil used as the working fluid in the liquid-pressure damper DB which will be described later is used. This is not limiting, and other liquid may be used as long as it has lubricity.

The piston rod 2A penetrating the rod guide 7A is held in a state suspended by a cap member 4. In FIG. 1, a lower side of the piston rod 2A goes into/out of the cylinder 1A while being pivotally supported by an annular bush 70 fitted in an inner periphery of the rod guide 7A, movably in an axial direction. The piston rod 2A is formed having a cylindrical shape, and a wiring v11 through which an electric current is made to flow in a coil v10 constituting viscosity adjusting means V1 which will be described later passes through an inside thereof. The piston 3A is held at the distal end of the piston rod 2A, and a rebound spring S2 arranged between the piston 3A and the rod guide 7A is provided on an outer periphery of the piston rod 2A. The rebound spring S2 absorbs an impact when the magnetic viscous fluid damper DA extends to the maximum. The rebound spring S2 in this embodiment is a coil spring. Instead of this, an elastic body such as rubber and the like may be used.

The piston 3A includes a piston assy 30 screwed with an outer periphery of a distal end portion of the piston rod 2A, an annular ring 31 arranged on an outer periphery of the piston assy 30 and having a piston passage L1 formed between itself and the piston assy 30, and an annular plate 32 connecting the ring 31 to the piston assy 30. The piston assy 30 and the ring 31 are both formed of a magnetic body. The piston passage L1 is made of an annular gap formed between the piston assy 30 and the ring 31. On the plate 32, a hole without reference numeral, penetrating vertically, is formed. The rod-side chamber r1 and the piston-side chamber r2 communicate with each other through this hole and the piston passage L1.

Viscosity of the magnetic viscous fluid passing through the piston passage L1 can be adjusted by viscosity adjusting means V1. The viscosity adjusting means V1 is composed of the coil v10 wound around the outer periphery of the piston assy 30 and conducting means for conducting electricity to the coil v10. The conducting means is provided with a controller, not shown, capable of adjusting an electric current amount flowing through the coil v10 and a wiring v11 connecting the controller and the coil v10 to each other and generates a magnetic field in the piston passage L1 by conducting electricity to the coil v10. Since the controller is provided outside the damper body T, a part v11a of the wiring v11 passing inside the piston rod 2A extends to an outside of the damper body T. A supplied electric current amount to the coil v10 is adjusted in three stages, that is, "large", "medium", and "small" by operation by a user on the controller. The supplied electric current amount to the coil v10 is changed only when the user operates the controller. This is not limiting, and the supplied electric current amount to the coil v10 can be adjusted as appropriate, and the adjustment may be made by switching ON/OFF of conduction or it may be multi-stage adjustment other than three stages or may be continuously variable adjustment.

The magnetic viscous fluid is a liquid in which particles having ferromagnetism are distributed in a liquid such as oil and the like and becomes highly viscous by an action of the magnetic field. Viscosity of the magnetic viscous fluid is changed in accordance with intensity of the magnetic field and returns to an original state if the magnetic field is removed. The magnetic viscous fluid is filled in the rod-side chamber r1 and the piston-side chamber r2.

Subsequently, an operation of the magnetic viscous fluid damper DA will be explained.

In extension of the magnetic viscous fluid damper DA when the piston rod 2A retreats from the cylinder 1A, the magnetic viscous fluid in the rod-side chamber r1 pressurized by the piston 3A passes through the piston passage L1 and moves to the piston-side chamber r2. Thus, the magnetic viscous fluid damper DA generates an extension-side damping force caused by resistance when the magnetic viscous fluid passes through the piston passage L1. At this time, the in-cylinder capacity increases only for a portion of a volume of the piston rod retreating from the cylinder 1A. However, since the free piston 4 moves to an upper side in FIG. 1 by a pressure in the gas chamber r3, the in-cylinder capacity is contracted. As described above, an increased portion of the in-cylinder capacity is compensated for by the gas chamber r3.

On the other hand, in compression of the magnetic viscous fluid damper DA when the piston rod 2A enters into the cylinder 1A, the magnetic viscous fluid in the piston-side chamber r2 pressurized by the piston 3A passes through the piston passage L1 and moves to the rod-side chamber r1. Thus, the magnetic viscous fluid damper DA generates a compression-side damping force caused by resistance when the magnetic viscous fluid passes through the piston passage L1. At this time, the in-cylinder capacity decreases only for a portion of the volume of the piston rod entering into the cylinder 1A. However, since the free piston 4 moves to a lower side in FIG. 1 by the pressure in the gas chamber r3, the in-cylinder capacity expands. As described above, a decreased portion of the in-cylinder capacity is compensated for by the gas chamber r3.

Figure 3:
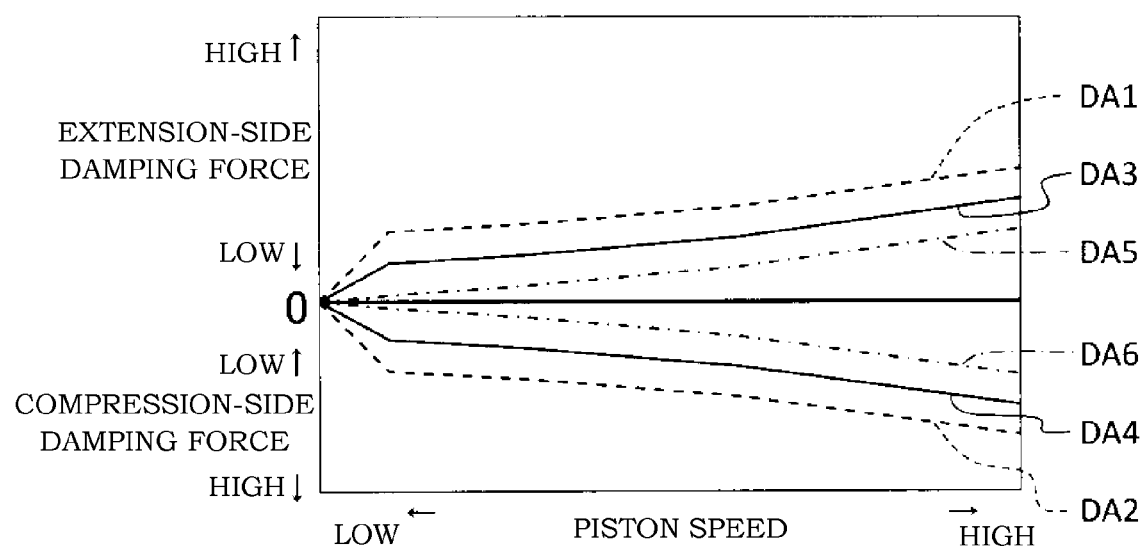
FIG. 3 is a view illustrating a damping characteristic of the magnetic viscous fluid damper which is one of the pair of dampers constituting the front fork according to the embodiment of the present invention.

A damping characteristic (a change of the damping force with respect to the piston speed) of the magnetic viscous fluid damper DA singularly is, as illustrated in FIG. 3, substantially equal on the extension side and the compression side. Moreover, the larger the supplied electric current amount to the coil v10 becomes, the higher the damping force of the magnetic viscous fluid damper DA becomes. In FIG. 3, a broken line DA1 indicates the damping characteristic on the extension side when the supplied electric current amount is set to "large", while a broken line DA2 indicates the damping characteristic on the compression side when the supplied electric current amount is similarly set to "large". A solid line DA3 indicates the damping characteristic on the extension side when the supplied electric current amount is set to "medium", while a solid line DA4 indicates the damping characteristic on the compression side when the supplied electric current amount is similarly set to "medium". A one-dot chain line DA5 indicates the damping characteristic on the extension side when the supplied electric current amount is set to "small", while a one-dot chain line DA6 indicates the damping characteristic on the compression side when the supplied electric current amount is similarly set to "small". The damping force and the damping characteristic of the magnetic viscous fluid damper DA can be changed as appropriate by adjusting the supplied electric current amount to the coil v10.

Subsequently, the liquid-pressure damper DB forming a pair with the magnetic viscous fluid damper DA will be explained. The liquid-pressure damper DB includes, as illustrated in FIG. 2, the damper body T, a cylindrical cylinder 1B arranged concentrically with the damper body T, a piston rod 2B going into/out of the cylinder 1B with extension/contraction of the damper body T, and a piston 3B held at a distal end of the piton rod 2B and defining the rod-side chamber r1 and the piston-side chamber r2 formed in the cylinder 1B. In the rod-side chamber r1 and the piston-side chamber r2, oil as the working fluid (hereinafter referred to as a working oil) is filled. Between the cylinder 1B and the damper body T, a reservoir r4 for compensating for the in-cylinder capacity is formed. In the reservoir r4, the working oil is reserved and also, a gas is sealed on an upper side through its liquid surface. For the working fluid of the liquid-pressure damper DB, liquids other than oil such as water, an aqueous solution and the like may be used.

The cylinder 1B is fixed to the wheel-side bracket 5 so that its shaft center becomes coaxial with the shaft center of the inner tube t2. Specifically, a lower end portion of the inner tube t2 is screwed with the inner periphery of the upper opening portion 5a of the wheel-side bracket 5, a base rod 8 is fixed to a bottom portion 5b of the wheel-side bracket by a bolt 80, and the cylinder 1B is screwed with an outer periphery of the base rod 8. To an upper opening portion of the cylinder 1B, an annular rod guide 7B is fixed, and the piston rod 2B penetrates a shaft center portion of the rod guide 7B.

The piston rod 2B is held in a state suspended by the cap member 4. In FIG. 2, a lower side of the piston rod 2B goes into/out of the cylinder 1B while being pivotally supported by the annular bush 70 fitted in an inner periphery of the rod guide 7B, movably in the axial direction. The piston 3B is held at a distal end of the piston rod 2B, and the rebound spring S2 arranged between the piston 3B and the rod guide 7B is provided on an outer periphery of the piston rod 2B. The rebound spring S2 absorbs an impact when the liquid-pressure damper DB extends to the maximum. The rebound spring S2 in this embodiment is a coil spring. Instead of this, an elastic body such as rubber and the like may be used.

The piston 3B is in sliding contact with an inner peripheral surface of the cylinder 1B and defines the rod-side chamber r1 formed on an upper side of the piston 3B in the cylinder 1B and the piston-side chamber r2 formed on a lower side of the piston 3B in the cylinder 1B. In the piston 3B, a piston passage L2 on an extension side and a piston passage L3 on a compression side allowing the rod-side chamber r1 and the piston-side chamber r2 to communicate with each other are formed. On the piston-side chamber r2 side of the piston 3B, an extension-side damping valve V2 closing an outlet of the piston passage L2 on the extension side capable of opening/closing and allowing a flow of the working oil moving from the rod-side chamber r1 to the piston-side chamber r2, while preventing a flow in an opposite direction is provided. On the rod-side chamber r1 side of the piston 3B, a compression-side check valve V3 closing an outlet of the piston passage L3 on the compression side capable of opening/closing and allowing the flow of the working oil moving from the piston-side chamber r2 to the rod-side chamber r1, while preventing the flow in the opposite direction is provided.

The base rod 8 fixing the cylinder 1B to the wheel-side bracket 5 includes a base end portion 8a with which the cylinder 1B is screwed and a shaft portion 8b extending upward from the base end portion 8a. To a distal end of the shaft portion 8b, a base member 9 inserted into the cylinder 1B is fixed. On a lower part of the cylinder 1B, a through hole 10 allowing an inside and an outside (reservoir r4) of the cylinder 1B to communicate with each other is formed. The base member 9 is arranged above the through hole 10 and defines the piston-side chamber r2 and the reservoir r4.

In the base member 9, a base member passage L4 on an extension side and a base member passage L5 on the compression side allowing the piston-side chamber r2 to communicate with the reservoir r4 respectively are formed. On the piston-side chamber r2 side of the base member 9, an extension-side check valve V4 closing an outlet of the base member passage L4 on the extension side capable of opening/closing and allowing a flow of the working oil moving from the reservoir r4 to the piston-side chamber r2, while preventing the flow in the opposite direction is provided. On the reservoir r4 side of the base member 9, a compression-side damping valve V5 closing an outlet of the base member passage L5 on the compression side capable of opening/closing and allowing the flow of the working oil moving from the piston-side chamber r2 to the reservoir r4, while preventing the flow in the opposite direction is provided.

Subsequently, an operation of the liquid-pressure damper DB will be explained.

In the extension of the liquid-pressure damper DB when the piston rod 2B retreats from the cylinder 1B, the working oil in the rod-side chamber r1 pressurized by the piston 3B passes through the piston passage L2 on the extension side and moves to the piston-side chamber r2, and the working oil for a portion of the volume of the piston rod retreated from the cylinder 1B passes through the base member passage L4 on the extension side and moves from the reservoir r4 to the piston-side chamber r2. Thus, the liquid-pressure damper DB generates the extension-side damping force caused by resistance of the extension-side damping valve V2 and the extension-side check valve V4 when the working oil passes through the piston passage L2 and the base member passage L4 on the extension side. Since a valve opening pressure of the extension-side check valve V4 is set low, the extension-side damping force generated by the liquid-pressure damper DB is caused mainly by the resistance of the extension-side damping valve V2.

On the other hand, in contraction of the liquid-pressure damper DB when the piston rod 2B enters into the cylinder 1B, the working oil in the piston-side chamber r2 pressurized by the piston 3B passes through the piston passage L3 on the compression side and moves to the rod-side chamber r1, and the working oil for a portion of the volume of the piston rod entering into the cylinder 1B passes through the base member passage L5 on the compression side and moves from the piston-side chamber r2 to the reservoir r4. Thus, the liquid-pressure damper DB generates the compression-side damping force caused by resistance of the compression-side check valve V3 and the compression-side damping valve V5 when the working oil passes through the piston passage L3 on the compression side and the base member passage L5. Since the valve opening pressure of the compression-side check valve V3 is set low, the compression-side damping force generated by the liquid-pressure damper DB is caused mainly by the resistance of the compression-side damping valve V5.

Figure 4:
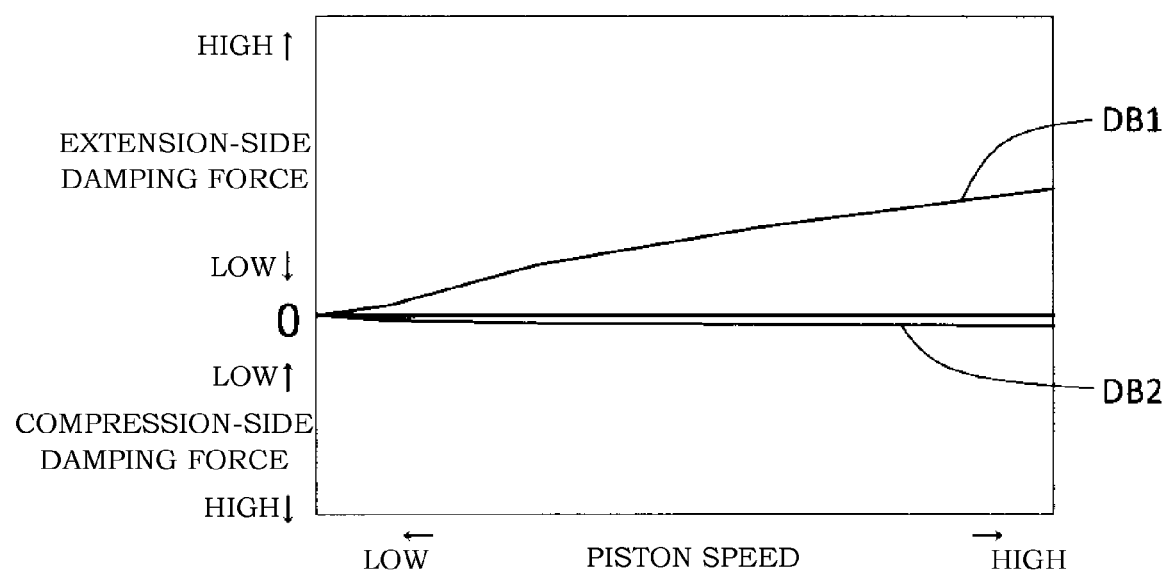
FIG. 4 is a view illustrating a damping characteristic of the liquid-pressure damper which is the other of the pair of dampers constituting the front fork according to the embodiment of the present invention.

The damping characteristic (a change in the damping force with respect to the piston speed) of the liquid-pressure damper DB singularly is set such that, as illustrated in FIG. 4, the extension-side damping force is large and the compression-side damping force is small. In FIG. 4, a solid line DB1 indicates the damping characteristic on the extension side, and a solid line DB2 indicates the damping characteristic on the compression side. The damping force and the damping characteristic of the liquid-pressure damper DB can be changed as appropriate by adjusting valve opening characteristics of the extension-side damping valve V2 and the compression-side damping valve V5.

Figure 5:
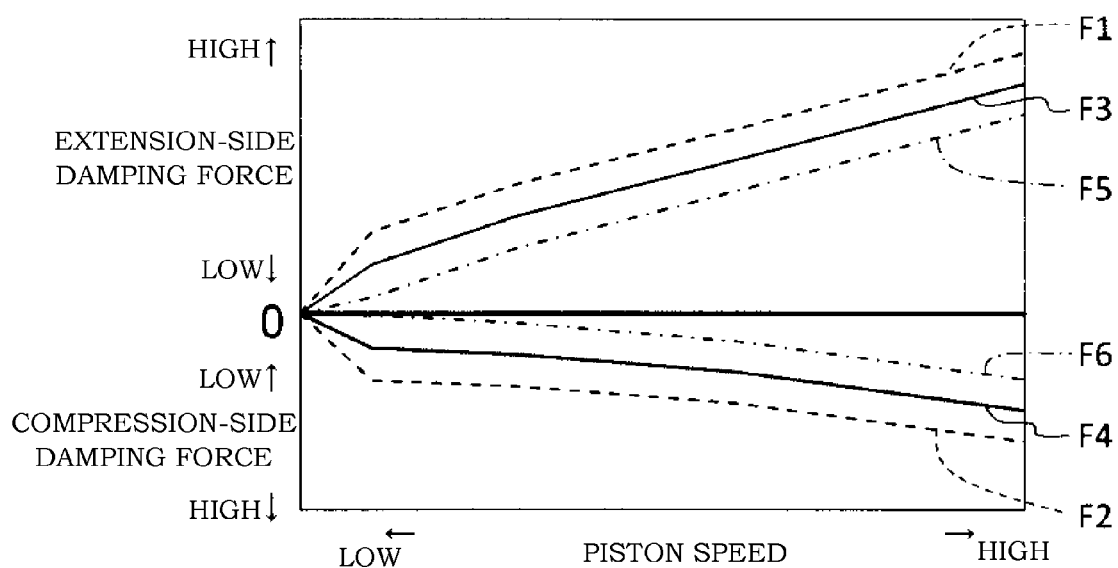
FIG. 5 is a view illustrating a damping characteristic of the front fork according to the embodiment of the present invention.
Figure 6:
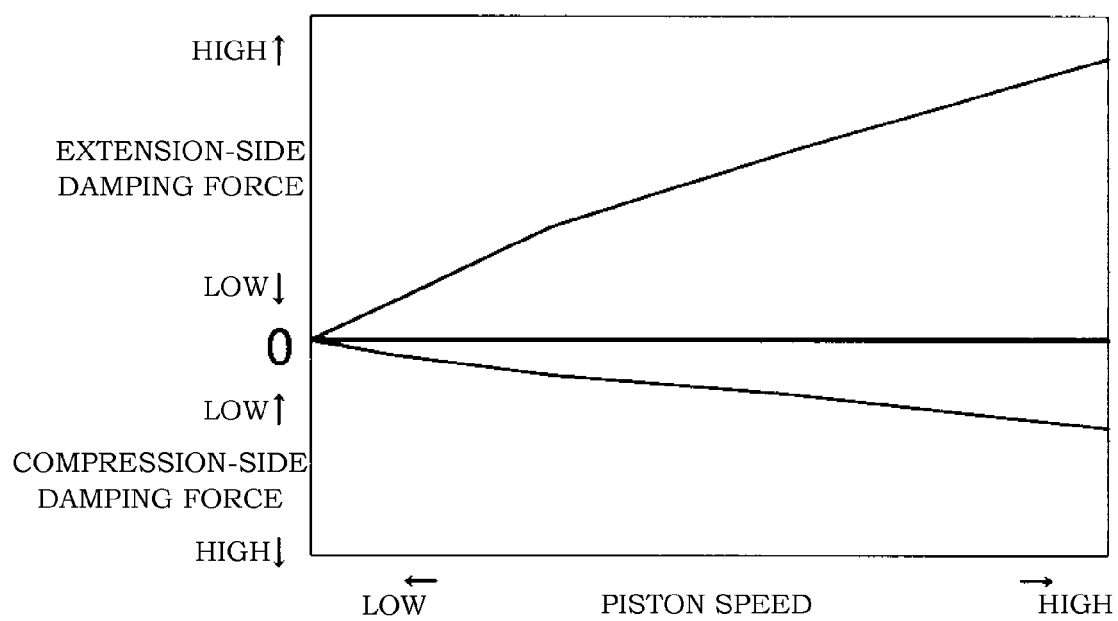
FIG. 6 is a view illustrating a damping characteristic of a prior-art front fork.
Figure 7:
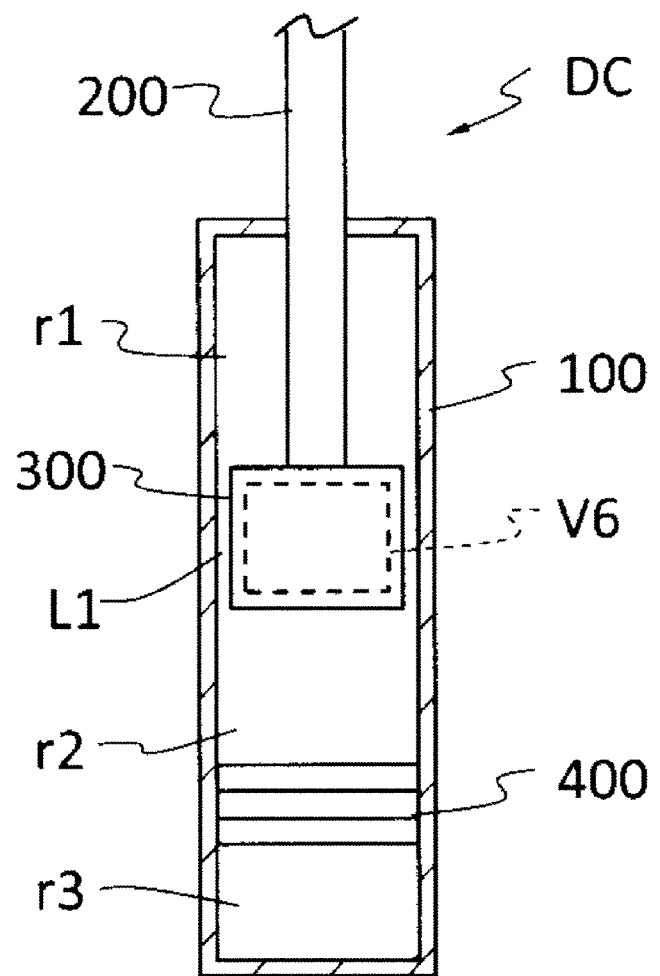
FIG. 7 is an outline sectional view of a prior-art magnetic viscous fluid damper.

The damping characteristic of the front fork according to the embodiment becomes a characteristic as illustrated in FIG. 5 which is obtained by synthesizing the damping characteristic of the magnetic viscous fluid damper DA in which the extension-side damping force and the compression-side damping amount are substantially equal and the damping characteristic of the liquid-pressure damper DB in which the extension-side damping force is large and the compression-side damping force is small and approximates the desired damping characteristic of the prior-art front fork illustrated in FIG. 6.

The damping characteristic on the extension side in the front fork in which the supplied electric current amount to the coil v10 is set to "large" becomes such as indicated by a broken line F1 in FIG. 5, and the damping characteristic on the compression side in the front fork in which the supplied electric current amount is set to "large" becomes such as indicated by a broken line F2. The damping characteristic on the extension side in the front fork in which the supplied electric current amount is set to "medium" becomes such as indicated by a solid line F3, and the damping characteristic on the compression side in the front fork in which the supplied electric current amount is set to "medium" becomes such as indicated by a solid line F4. The damping characteristic on the extension side in the front fork in which the supplied electric current amount is set to "low" becomes such as indicated by a one-dot chain line F5, and the damping characteristic on the compression side in the front fork in which the supplied electric current amount is set to "low" becomes such as indicated by a one-dot chain line F6.

In this embodiment, as indicated by the solid line DB2 in FIG. 4, the compression-side damping force generated by the liquid-pressure damper DB is set so as to be extremely low and thus, the compression-side damping force generated by the front fork is mainly generated by the compression-side damping force of the magnetic viscous fluid damper DA. Therefore, it is only necessary that the compression-side damping force of the magnetic viscous fluid damper DA is set so that the compression-side damping force of the front fork becomes a desired damping force, and the extension-side damping force of the liquid-pressure damper DB is set so as to compensate for the extension-side damping force which runs short in the magnetic viscous fluid damper DA by the liquid-pressure damper DB so that the extension-side damping force of the front fork becomes the desired damping force. As described above, matters which should be considered in setting the damping forces of the both dampers DA and DB are fewer, and thus, the respective damping forces can be set easily.

Moreover, by setting the compression-side damping force of the liquid-pressure damper DB to a required minimum compression-side damping force in the front fork, the compression-side damping force can be generated in the liquid-pressure damper DB in the case of a failure in which conduction to the magnetic viscous fluid damper DA becomes impossible. As described above, the liquid-pressure damper DB can be used for failsafe.

Subsequently, a working effect of the front fork according to this embodiment will be explained.

The front fork according to this embodiment includes the pair of dampers DA and DB standing on the both sides of the wheel, and one of the pair of dampers DA and DB is the magnetic viscous fluid damper DA using the magnetic viscous fluid whose viscosity is changed by the action of the magnetic field as the working fluid, while the other of the pair of dampers DA and DB is the liquid-pressure damper DB using a liquid such as oil, water, an aqueous solution and the like as the working fluid. Thus, even if the magnetic viscous fluid damper DA is used as a damper of a front fork, the damping force which runs short in the magnetic viscous fluid damper DA can be compensated for by the liquid-pressure damper DB which forms a pair with the magnetic viscous fluid damper DA, and thus, a desired damping characteristic can be realized without depending on the control rule.

The extension-side damping force generated in the liquid-pressure damper DB is set so as to be higher than the compression-side damping force. Thus, even if the extension-side damping force and the compression-side damping force generated in the magnetic viscous fluid damper DA are equal, the synthesized extension-side damping force of the both dampers DA and DB can be made higher than the synthesized compression-side damping force. Therefore, the pushing-up input can be relaxed by the low compression-side damping force, and the high extension-side damping force can be exerted in the subsequent extension stroke so that vibration of the sprung member and the unsprung member can be conversed quickly. If it is preferable that the compression-side damping force generated by the front fork is higher than the extension-side damping force, it can be handled by setting the compression-side damping force generated by the liquid-pressure damper DB higher than the extension-side damping force.

Moreover, the compression-side damping force generated by the liquid-pressure damper DB is set extremely low, and most of the compression-side damping force generated by the front fork is generated by the magnetic viscous fluid damper DA. Thus, it is only necessary that, in order to obtain a desired compression-side damping force of the front fork, the compression-side damping force of the magnetic viscous fluid damper DA is set, while in order to obtain a desired extension-side damping force of the front fork, the extension-side damping force of the liquid-pressure damper DB is set so that the extension-side damping force which runs short in the magnetic viscous fluid damper DA is compensated for by the liquid-pressure damper DB. Since matters which should be considered in setting the damping forces of the both dampers DA and DB are fewer, the respective damping forces can be set easily.

Moreover, by setting the compression-side damping force of the liquid-pressure damper DB to the required minimum compression-side damping force in the front fork, in the case of a failure in which conduction to the magnetic viscous fluid damper DA becomes impossible, the compression-side damping force can be generated in the liquid-pressure damper DB.

Embodiments of the present invention were described above, but the above embodiments are merely examples of applications of the present invention, and the technical scope of the present invention is not limited to the specific constitutions of the above embodiments.

This application claims priority based on Japanese Patent Application No. 2013-065545 filed with the Japan Patent Office on Mar. 27, 2013, the entire contents of which are incorporated into this specification.

The invention claimed is:

1. A front fork, comprising:
 a pair of dampers standing on both sides of a wheel, the pair of dampers including a magnetic viscous fluid damper and a liquid-pressure damper,
  the magnetic viscous fluid damper being configured to generate a damping force using a magnetic viscous fluid as a working fluid, a viscosity of the magnetic viscous fluid varying depending on a magnetic field strength applied to the magnetic viscous fluid,
  the liquid-pressure damper being configured to generate another damping force using a liquid including oil, water, or an aqueous solution as the working fluid.

2. The front fork according to claim 1, wherein an extension-side damping force generated by the liquid-pressure damper is set higher than a compression-side damping force generated by the liquid-pressure damper.

3. The front fork according to claim 1, wherein the magnetic viscous fluid damper generates a compression-side damping force in the front fork; and
  the magnetic viscous fluid damper includes a coil configured to generate a magnetic field when electric current is supplied to the coil, and is capable of adjusting the viscosity of the magnetic viscous fluid by adjusting an amount of the electric current supplied to the coil.

4. The front fork according to claim 1, wherein the liquid-pressure damper generates a minimum required compression-side damping force in the front fork.

5. The front fork according to claim 1, wherein a compression-side damping force generated by the magnetic viscous fluid is greater than a compression-side damping force generated by the liquid-pressure damper.

* * * * *